Nov. 2, 1954 — S. C. HETH — 2,693,393
FLOATING AXLE CONSTRUCTION
Filed March 7, 1951
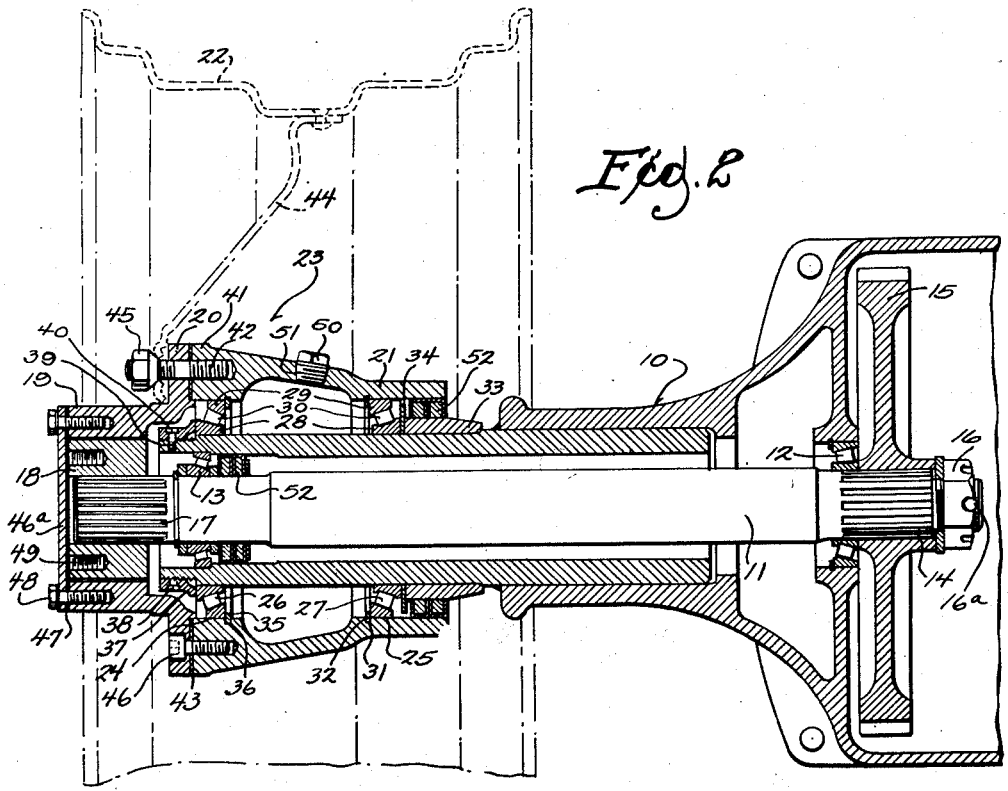
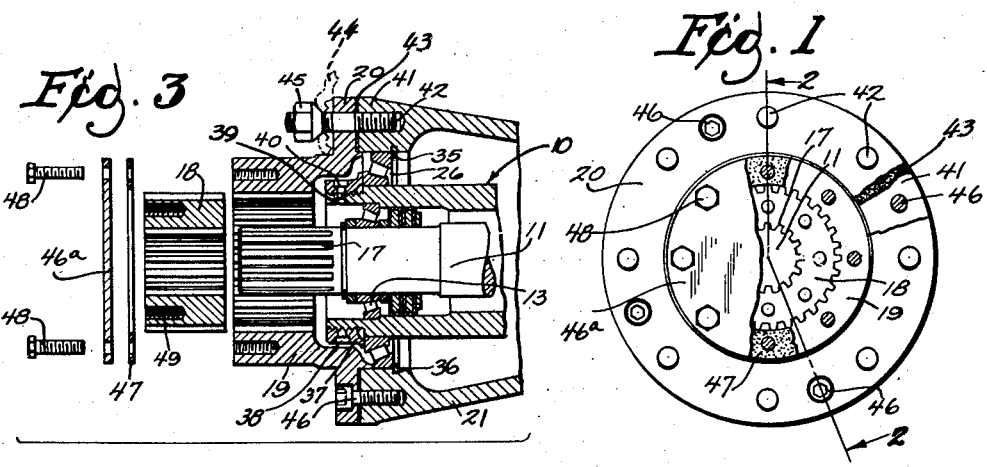
Inventor
SHERMAN C. HETH
By
Attorney

United States Patent Office 2,693,393
Patented Nov. 2, 1954

2,693,393
FLOATING AXLE CONSTRUCTION

Sherman C. Heth, Racine, Wis., assignor to J. I. Case Company, Racine, Wis., a corporation of Wisconsin Application March 7, 1951, Serial No. 214,339

2 Claims. (Cl. 301—1)

The present invention relates to a floating axle construction and the primary object of the present invention is to improve the operation and construction of mechanisms of this kind.

A further object of the present invention is to provide a hub assembly having a portion provided with bearing seats of substantially equal internal diameter rotatably mounted on the axle housing by bearing assemblies of substantially equal size and a second portion in driving relationship with the first portion and in driven relationship with the axle shaft by means of a coupling, the coupling being easily removable for permitting the rotation of the hub assembly without driving the axle shaft.

Another object of the present invention relates to the production of a floating axle construction which is of simple form and in which the parts can be readily assembled and retained in their assembled relationship.

Other features of the present invention will result from the drawings and following detailed description of a specific embodiment thereof.

In the drawings:

Fig. 1 is an end view of an axle construction embodying the present invention, with parts removed, and with parts broken away to show details in construction.

Fig. 2 is a sectional view of the construction shown in Fig. 1 taken on the line 2—2 of Fig. 1, with parts removed.

Fig. 3 is an exploded view of a certain structure shown in Fig. 2.

Referring to the drawings an axle construction embodying the present invention is shown comprising an axle housing 10, formed in the present instance of cast iron or other suitable material, which is adapted to receive and enclose an axle shaft 11. The axle shaft 11 is co-axially rotatably supported in housing 10 by antifriction bearings 12 and 13 of any suitable type, and is provided adjacent its inner end with a splined portion 14 for drivingly accommodating a final drive gear 15 thereon, final drive gear 15 being in meshed relationship with respect to a spur gear or other suitable construction of a transmission of any suitable or well known type, the spur gear and the transmission not being shown as they form no part of the present invention. A lock nut 16 of any well known construction is threaded on the inner end of axle shaft 11 for securing final drive gear 15 in its aligned position with respect to the spur gear and its associated transmission, nut 16 being locked against rotation by a cotter pin or other suitable means 16a. The outer end of the axle shaft 11 protrudes laterally from the housing 10 and is splined as indicated at 17 to drivingly receive thereon a sleeve cap or coupling 18. The sleeve cap 18 is in turn splined on its outer periphery and is adapted to drivingly accommodate a hub cap 19, hub cap 19 being provided with a radial flange 20 which is adapted to be secured to a hub 21 and a vehicle wheel rim 22 as will appear hereinafter, hub cap 19 and hub 21 comprising a two piece hub assembly designated by the number 23.

The hub 21 is of substantially annular construction having bearing seats 24 and 25 of substantially equal internal diameter and is mounted on antifriction bearings 26 and 27 on axle housing 10 to provide for its rotation relatively thereto. The two bearing assemblies constituting the mountings are substantially identical as to size, each of these bearings consisting of an inner race 28, an outer race 29, and antifriction roller elements 30, preferably of a character which provides for adjustment of the clearance between the roller elements and the races by relative axial movement between the races. A snap ring 31 is fitted in an annular groove 32 formed in the inner circumference of the bearing seat 25, this snap ring being adapted to act as an outer bearing abutment for the bearing 27 by reason of the abutment of the ring against the outer race 29. The axle housing 10 is provided with an abutment ring 33 welded thereto and a washer 34 against which the inner axial end of the inner race 28 of bearing 27 is adapted to abut to effect an inner axial abutment for this bearing assembly.

The bearing assembly 26 is located by means of a snap ring 35 which enters an annular groove 36 formed in the bearing seat 24. The outer race 29 of bearing 26 is held against snap ring 35 by means of a lock ring 37 threaded to the end of the axle housing 10 and adapted to abut the inner race 28 of bearing 26. To prevent the lock ring 37 from working itself off the threaded portion of axle housing 10, a plurality of openings 38 are formed in the lock ring 37 and a threaded opening 39 is formed in the threaded portion of the housing 10 for accommodating a lock screw 40 for locking lock ring 37 in various axial positions on the threaded portion of housing 10.

As previously suggested the inner race 28 of bearing 26 can be moved to the right, Fig. 1, by turning lock ring 37 in the correct direction on the threaded portion of housing 10 so that the adjustment of inner race 28 of bearing 26 will remove any slack in bearing 27. If the bearings 26 and 27 are too tight, the lock ring should be turned in the opposite direction so as to allow the inner race 28 of bearing 26 to move to the left the necessary distance. When the correct adjustment for the bearings 26 and 27 has been found, the lock ring 27 is locked against movement on the threaded portion of the housing 10 by means of the lock screw 40 in a manner previously pointed out.

The hub 21 is provided with an annular boss 41 extending inwardly from the outer axial extremity of the hub, the inner peripheral surface of boss 41 being bearing seat 24 as previously suggested. A plurality of studs 42 of any suitable construction project axially from boss 41 and are adapted to receive the radial flange 20 of the hub cap 19 and a suitable gasket 43, by means of suitable openings formed in the flange and gasket. A radial flange 44 of the wheel rim 22 is received by the laterally projecting threaded portion of studs 42 and is held against flange 20 of the hub cap 19 by means of suitable nuts 45. Suitable screws 46 are threadedly engaged in the flange 20 and the boss 41 for drivingly connecting the hub cap 19 with the hub 21 as previously suggested.

For preventing dirt or the like from entering the housing 10 and the hub assembly 23, a plate 46a and a gasket 47 of any suitable construction are secured to the axial end of the hub cap 19 by means of suitable screws or the like 48. Tapped openings 49 are formed axially in the splined sleeve 18 for permitting engagement thereof with a spline puller of any suitable construction for allowing for the removal of sleeve 18 if and when desired as will be explained more fully hereinafter.

As previously suggested the internal diameters of the bearing seats 24 and 25 are substantially equal which it will be appreciated enables the hub to be internally machined in relatively few steps and with only one tool, as for example by boring clear through the hub. It will be further appreciated that the cost of manufacture is further reduced by the customary discount available in the purchase of bearings of one size and type as against the purchase of the same number of bearings but of two or more different sizes, the bearings 26 and 27 being substantially of identical size and type as previously suggested. As a consequence of the fact that the bearing seats are substantially equal in internal diameter, the bearings may be assembled from the outer and inner ends of hub 21 respectively, snap rings 31 and 35 being first positioned in the grooves 32 and 36 respectively and then the bearings 27 and 26 being inserted in their respective bearing seats until they abut the snap rings 31 and 35. The hub and bearing assembly is then telescoped with axle housing 10, being pushed inwardly over the housing until the inner race 28 of bearing 27 abuts the washer 34 which in turn as previously mentioned abuts stop ring 33. The lock ring 37 is next threaded on the end of housing 10 until it abuts the inner race 28 of bearing 26 and upon the proper adjustment for the bearings 26 and 27 being reached, in a manner previously described, lock screw 40 is inserted in the proper opening 38 and threaded into the tapped opening 39 for locking the lock ring in its adjusted position on the threaded portion of housing 10. The hub cap 19 is next assembled on the axle shaft 11 and secured to the hub 21 by means of screws 46 as previously described, and then the coupling 18, which effects a driving relationship between the axle shaft 11 and the hub cap 19 of the hub assembly 23, is inserted in the splined portion of the hub cap 19 and over the splined portion 17 of the axle shaft 11.

A pipe plug 50 is threadedly engageable in a tapped opening 51 formed in the hub 21 for providing means for entry of a lubricant. Suitable sealing means 52 are positioned between stop ring 33 and bearing seat 25 and inwardly of bearing 12 between axle shaft 11 and housing 10 for retaining the lubricant within the hollow interior of the hub assembly 23.

The axle construction of the present invention is primarily adapted for use with a self-propelled combine or similar type machine which in operation travels at relatively slow speeds. In the event the user of a machine of this type wishes to transport the machine any great distance, it is advantageous to pull the machine with a truck or other vehicle instead of running the machine under its own power. Since the transmission parts of these machines are not built for high speeds, any substantial road speed would result in such high rates of rotation in these parts as to impair their lubrication and endanger the same. To enable the hub assembly 23 to be rotated at high speed without damaging the transmission parts, the coupling 18 as previously suggested, is capable of being pulled off the splined portion of the hub cap 19 and axle shaft 11 so that the machine is capable of being pulled at relatively high speeds without driving axle shaft 11 and consequently the transmission parts. More specifically, in operation the user first removes pipe plug 50 and rotates the hub 21 sufficiently to permit the lubricant to flow out of opening 51 into a suitable container. Then the plate 46a and the gasket 47 are removed by unscrewing screws 48 for permitting a spline puller of any suitable construction to be threaded into the threaded openings 49 for pulling the coupling off the splined portion 17 of the axle shaft 11 and off the splined portion of hub cap 19, Fig. 3. Upon pulling the coupling so as to interrupt the transmission of motion from the hub assembly 23 to the axle shaft 11, the plate 46a and the gasket 47 are again secured to the hub cap 19 by screws 48 and the lubricant is returned into the hub assembly 23 and plug 50 secured into opening 51. Upon reaching the point of destination, this procedure is reversed and the machine is again in an operative condition. It will be appreciated that coupling 18 in one sense is a free-wheeling device which upon disengagement allows the machine to be pulled at high speeds while in transport without excessive speed-up in the transmission parts while in another sense it is a coupling device which, when inserted over the splined portion 17 of axle shaft 11 and in the splined portion of hub cap 19, effects a driving connection between the axle shaft and the hub assembly.

The invention having been set forth, what is claimed as new and useful is:

1. In a harvesting machine of the self-propelled type, the transmission parts of said machine being designed for driving the machine in operation at relatively slow speeds, and which machine in the event that the same is to be pulled behind a vehicle at a speed greater than the speed for which the transmission parts were intended to handle instead of being operated under its own power: the improvement comprising an axle assembly including an axle housing provided with an abutment and having a threaded lateral end portion, an axle shaft received by said axle housing and provided with a splined end portion protruding from said axle housing, spaced inner and outer anti-friction bearings between said axle shaft and said axle housing for rotatably supporting said axle shaft, the outer anti-friction bearing being positioned adjacent the lateral end portion of said axle housing, an annular hub telescopically disposed on said axle housing and having bearing seats formed substantially adjacent the opposite ends thereof of substantially equal internal diameter, inner and outer bearing assemblies of substantially equal size between said bearing seats and said axle housing, a snap ring for locking the inner bearing assembly adjacent said abutment on said axle housing, a lock ring threaded on said threaded portion of said axle housing, means for locking said lock ring against rotation in various axial positions on said threaded portion of said axle housing, a snap ring for locking the outer bearing assembly against said lock ring, a hub cap encircling the spline portion of said axle shaft and having a radial flange secured to the axial end of said hub, the inner circumferential surface of said hub cap being splined, a coupling inserted in the spline portion of said hub cap and over the splined end portion of said axle shaft for effecting a driving connection between said axle shaft and said hub cap, said coupling being provided with means for permitting said coupling to be easily pulled off the splined end portion of said axle shaft and out of the hub cap for effecting a disconnection between said hub and said axle shaft for permitting said hub to be rotated independently of said axle shaft.

2. In a harvesting machine of the self-propelled type, the transmission parts of said machine being designed for driving the machine in operation at relatively slow speeds, and which machine in the event that the same is to be transported any great distance is intended to be pulled behind a vehicle at highway speeds, any substantial highway speed resulting in such high rates of rotation in said transmission parts as to impair their lubrication and endanger the same: the improvement comprising an axle assembly including an axle housing provided with an abutment and having a threaded lateral end portion, said lateral end portion having formed therein a threaded radial opening, an axle shaft received by said axle housing and provided with a spline end portion protruding from said axle housing, spaced inner and outer anti-friction bearings between said axle shaft and said axle housing for rotatably supporting said axle shaft, the outer anti-friction bearing being positioned adjacent the lateral end portion of said axle housing, an annular hub telescopically disposed on said axle housing and having bearing seats formed substantially adjacent the opposite ends thereof of substantially equal internal diameter, inner and outer bearing assemblies of substantially equal size between said bearing seats and said axle housing, a snap ring for locking the inner bearing assembly adjacent said abutment on said axle housing, a lock ring threaded on said threaded portion of said axle housing, said lock ring having formed therein a plurality of radial openings, a screw insertable in any one of said openings and threadedly engaged in said threaded opening for locking said lock ring in various axial positions on the end portion of said axle housing, a snap ring for locking the outer bearing assembly against said lock ring, a hub cap encircling the spline portion of said axle shaft and having a radial flange secured to the axial end of said hub, the inner circumferential surface of said hub cap being splined, and a free-wheeling coupling having a splined bore formed therein and being drivingly received on the splined end portion of said axle shaft and the outer circumference of which is splined for being received by the inner circumferential surface of said hub cap for effecting a driving connection between said axle shaft and said hub, said free-wheeling coupling being provided with means for permitting said coupling to be easily pulled off the splined end portion of said axle shaft and out of the hub cap for effecting disconnection between said hub and said axle shaft for permitting said hub to be rotated independently of said axle shaft and for permitting said machine to be pulled at highway speed while in transport.

References Cited in the file of this patent

UNITED STATES PATENTS

| Number | Name | Date |
| --- | --- | --- |
| 844,490 | Williams | Feb. 19, 1907 |
| 1,482,838 | Casale | Feb. 5, 1924 |
| 2,052,524 | Baker | Aug. 25, 1936 |
| 2,189,695 | Alden | Feb. 6, 1940 |
| 2,235,457 | Lorimor | Mar. 8, 1941 |
| 2,346,950 | Strehlow | Apr. 18, 1944 |
| 2,609,243 | Ponnequin | Sept. 2, 1952 |

OTHER REFERENCES

S. K. F. Publication, April 1941. (Copy in Division 45.)